US012649404B1

(12) United States Patent
Katz et al.

(10) Patent No.: US 12,649,404 B1
(45) Date of Patent: Jun. 9, 2026

(54) LIFT MECHANISMS FOR MOBILE DRIVE UNITS HAVING IMPROVED SERVICEABILITY AND DURABILITY

(71) Applicant: Amazon Technologies, Inc., Seattle, WA (US)

(72) Inventors: Allan Katz, Londonderry, NH (US); Albert Demers, Canton, MA (US); Joseph Vincent Malone, Franklin, MA (US); John Eric Franklin, Boston, MA (US); Maya Senescu, Exton, PA (US); Timothy Joseph Jordan, North Andover, MA (US); Dragan Pajevic, Arlington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 617 days.

(21) Appl. No.: 18/066,774

(22) Filed: Dec. 15, 2022

(51) Int. Cl.
| | |
|---|---|
| *B60P 1/02* | (2006.01) |
| *F16H 19/08* | (2006.01) |
| *F16H 57/04* | (2010.01) |

(52) U.S. Cl.
CPC ............... *B60P 1/02* (2013.01); *F16H 19/08* (2013.01); *F16H 57/0424* (2013.01); *F16H 57/0471* (2013.01); *F16H 57/0495* (2013.01)

(58) Field of Classification Search
CPC ......... B60R 13/07; B60J 10/25; B60J 7/0084; B60P 1/02
See application file for complete search history.

(56) References Cited

U.S. PATENT DOCUMENTS

| | | | | |
|---|---|---|---|---|
| 2,991,120 A * | 7/1961 | Barenyi | .................... | B60R 9/04 |
| | | | | 296/213 |
| 9,764,776 B2 * | 9/2017 | Vigil | ....................... | B60R 13/07 |
| 11,001,443 B1 * | 5/2021 | Skaloud | ................ | B62D 63/04 |
| 12,043,528 B2 * | 7/2024 | Qiao | ......................... | B66F 7/28 |
| 2021/0178953 A1 * | 6/2021 | Odawara | .................. | B62B 3/00 |

* cited by examiner

*Primary Examiner* — Jonathan Snelting
(74) *Attorney, Agent, or Firm* — Athorus, PLLC

(57) ABSTRACT

Mobile drive units may comprise drive mechanisms and lift mechanisms to engage with, transport, and disengage from various payloads. The lift mechanisms may comprise various improvements for serviceability and durability of the mobile drive units. For example, various service access ports for maintenance of the lift mechanisms may be configured for quick and easy access, one or more cover plates may be designed for quick and reliable coupling and decoupling from the lift mechanisms, and a central cover of the lift mechanisms may be configured to channel liquids down and away from the lift mechanisms, thereby facilitating simpler and faster maintenance and improved durability of the lift mechanisms.

19 Claims, 8 Drawing Sheets

200A

221

220

222

110

224-2

224-1

228

229

223

LIFT MECHANISMS FOR MOBILE DRIVE UNITS HAVING IMPROVED SERVICEABILITY AND DURABILITY

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes, including receipt, sorting, transport, storage, packing, shipping, or other processing of items within a material handling facility, may be performed or facilitated by automated machinery, such as mobile drive units. Accordingly, there is a need for mobile drive units having improved serviceability and durability to perform various material handling processes within a material handling facility, thereby improving the speed, reliability, and efficiency of such processes.

DETAILED DESCRIPTION

Figure 1:
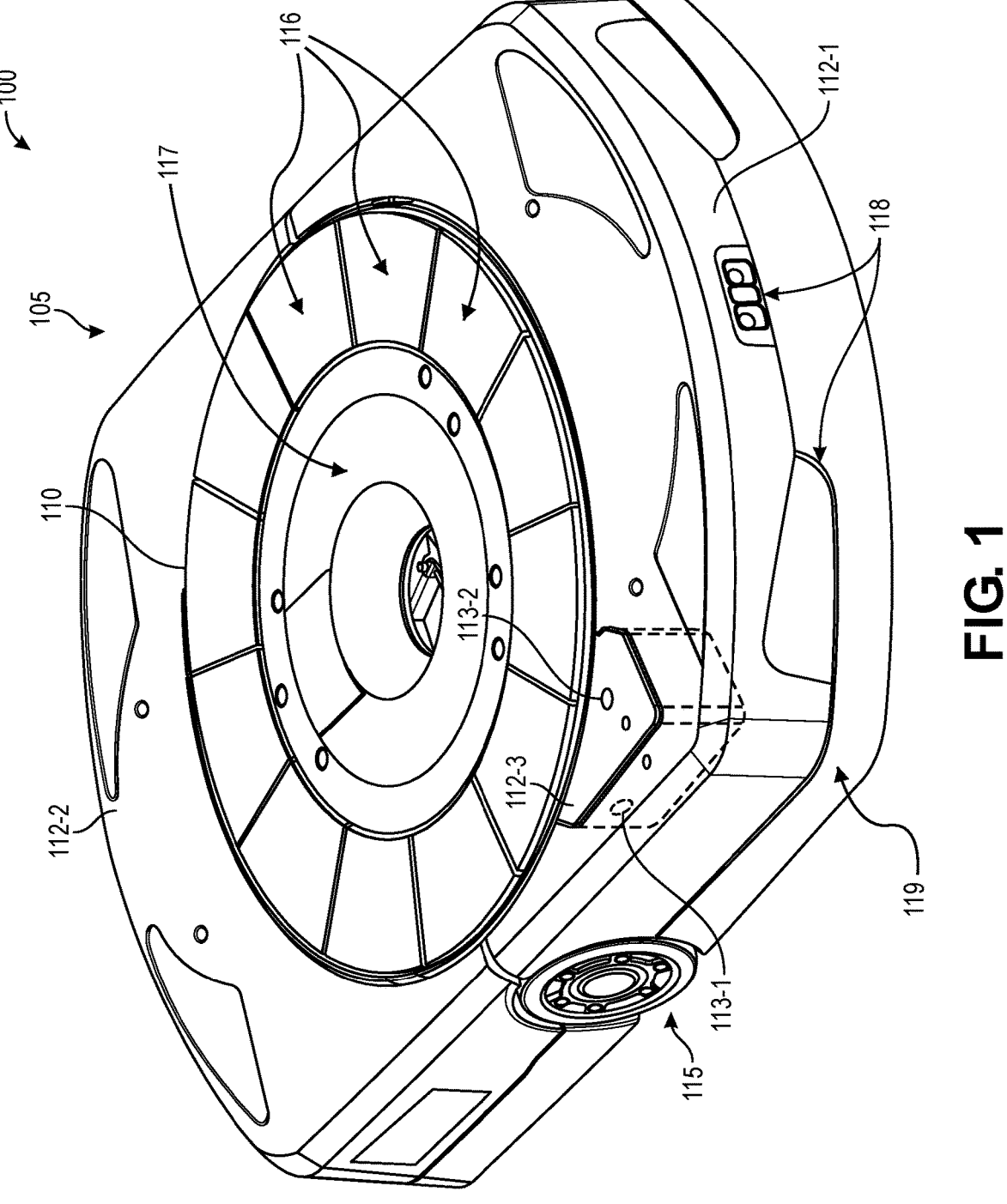
FIG. 1 is a schematic, perspective view diagram of an example mobile drive unit having a lift mechanism, in accordance with implementations of the present disclosure.

As is set forth in greater detail below, implementations of the present disclosure are directed to example lift mechanisms of mobile drive units having various features to provide improved serviceability and durability.

In example embodiments, a mobile drive unit may comprise a chassis or body, a drive mechanism, and a lift mechanism, as well as various processors, memories, sensors, communication devices, and/or other electronics. The lift mechanism for a mobile drive unit may move in various manners. For example, the lift mechanism may move vertically relative to a chassis or body of the mobile drive unit.

In addition, the lift mechanism may also rotate about a vertical axis, e.g., a rotating motion similar to a turntable.

In example embodiments, the mobile drive unit may raise the lift mechanism in order to engage or couple to various types of payloads, may transport engaged payloads using the drive mechanism, and may lower the lift mechanism in order to disengage or decouple from payloads. In addition, the mobile drive unit may rotate the lift mechanism in order to turn or reorient an engaged payload relative to the mobile drive unit.

In example embodiments, in order to maintain proper function and operation of the lift mechanism, the lift mechanism may comprise various improvements for serviceability and durability. For example, in order to ensure proper operation and maintenance of the turntable or rotating motion of the lift mechanism, service access ports for lubricating an actuating gear or pinion, a mating gear or gear teeth, a raceway, and/or bearings within the raceway may be provided in a particular configuration. In addition, a service access port for servicing or maintaining the raceway and associated bearings may also be provided in a particular configuration relative to the service access ports for lubrication.

In additional example embodiments, in order to ensure proper contact between the lift mechanism and payloads, and also to provide easier access to internal portions of the lift mechanism and mobile drive unit, cover plates of the lift mechanism may be configured with a particular combination of attachment posts to facilitate reliable engagement and easier removal for maintenance. In this manner, reliable engagement and transport of payloads by a lift mechanism of a mobile drive unit may be ensured, while also improving ease of access to portions of the lift mechanism and mobile drive unit for maintenance.

In further example embodiments, in order to maintain proper function and operation of the lift mechanism and mobile drive unit, various liquid management features may be incorporated into portions of the lift mechanism, in order to drain or remove any liquids that may come into contact with portions of the lift mechanism. Moreover, additional corresponding liquid management features may be incorporated into assemblies, subassemblies, or components proximate or below the lift mechanism, including the chassis of the mobile drive unit. In this manner, any liquids that may contact the lift mechanism of the mobile drive unit may be effectively drained or routed away from the lift mechanism of the mobile drive unit, thereby further ensuring safe and reliable engagement and transport of payloads.

FIG. 1 is a schematic, perspective view diagram 100 of an example mobile drive unit having a lift mechanism, in accordance with implementations of the present disclosure.

As shown in FIG. 1, an example mobile drive unit 105 may comprise a lift mechanism 110, a drive mechanism 115, one or more sensors 118, a chassis or body 119, and one or more chassis covers 112.

The chassis or body 119 may comprise one or more structural plates, surfaces, or components to which various other subassemblies, electronics, sensors, communication devices, or other components may be coupled or assembled, including the lift mechanism 110, the drive mechanism 115, the sensors 118, and the chassis covers 112. In addition, the chassis 119 may provide structural strength and rigidity to portions of the mobile drive unit in order to engage, lift, transport, rotate, lower, and disengage payloads. The chassis 119 may be formed of various materials, such as metals, plastics, composites, or combinations thereof.

The drive mechanism 115 may comprise one or more actuators or motors coupled to one or more drive wheels or rollers to cause movement of the mobile drive unit 105 within an environment. The drive mechanism 115 may be coupled to portions of the chassis 119 for structural strength and support. In some examples, the drive mechanism 115 may comprise a differential drive mechanism having one driven wheel on each side, e.g., on opposite sides, of the mobile drive unit 105. In other examples, various other numbers, configurations, or arrangements of actuators and drive wheels may form a drive mechanism 115 to facilitate movement of the mobile drive unit 105.

The chassis covers 112 may comprise one or more covers, shields, or guards that removably couple to and protect or conceal internal portions of the mobile drive unit 105. The chassis covers 112 may couple or engage with portions of the chassis 119 to form an enclosure or housing within which the various other subassemblies, electronics, sensors, communication devices, or other components may be coupled or assembled. In addition, one or more sensors 118 may be coupled to or extend through portions of the chassis covers 112, such as imaging devices, scanning devices, ranging sensors, proximity sensors, or various other types of sensors that may receive or detect data to facilitate navigation or operations of the mobile drive unit 105. Further, the chassis covers 112 may include corresponding holes or orifices to provide direct access to one or more service access ports 113 of the lift mechanism 110, as further described herein. The chassis covers 112 may be formed of various materials, such as metals, plastics, composites, or combinations thereof.

The lift mechanism 110 may comprise various structural components, actuators, and other components described herein to cause vertical and rotational movement of portions of the lift mechanism 110. The lift mechanism 110 may be coupled to portions of the chassis 119 for structural strength and support. For example, the upper portion of the lift mechanism 110, as illustrated in FIG. 1, may comprise a substantially circular or annular lift and rotation plate. The lift and rotation plate may move vertically upward to engage and couple with payloads, and may also move vertically downward to disengage and decouple from payloads. In addition, the lift and rotation plate may rotate around a vertical axis to rotate or reorient a payload relative to the mobile drive unit 105. Various components of the lift mechanism 110 may be formed of various materials, such as metals, plastics, composites, or combinations thereof.

As shown in FIG. 1, the lift mechanism 110 may comprise various service access ports 113 to facilitate service and maintenance of portions of the lift mechanism 110. One or more of the service access ports 113-1, 113-2 may be accessible through one or more holes or orifices formed in the chassis covers, e.g., chassis cover 112-3, to facilitate easy access for maintenance. In example embodiments, one or more components associated with the lift mechanism 110 may be covered, concealed, or protected by the chassis cover 112-3, and may also move vertically with vertical movement of the lift mechanism 110. As a result, the chassis cover 112-3 may also move vertically together with vertical movement of the lift mechanism 110. The service access port 113-1 may be directly accessible via a sidewall of the chassis cover 112-3 upon at least partial vertical movement of the lift mechanism upward away from the chassis 119, and the service access port 113-2 may be directly accessible via an upper surface of the chassis cover 112-3 in any vertical position of the lift mechanism.

In order to maintain smooth and continuous rotation of the lift and rotation plate of the lift mechanism 110, the service access ports 113 may be provided to allow lubrication of various moving components, such as an actuating pinion, a mating gear, a raceway, and/or a plurality of bearings within the raceway, as further described herein. Additional service ports may be provided to facilitate access to or maintenance of the raceway and/or bearings under one or more chassis covers 112-1, 112-2, as further described herein. In example embodiments, a raceway service access port may also be directly accessible via a side of the lift mechanism upon at least partial vertical movement of the lift mechanism upward away from the chassis 119.

Moreover, the various service access ports may be provided proximate or close to each other, e.g., on a same side, section, or portion of the lift mechanism, to further simplify and consolidate maintenance procedures related to the lift mechanism 110. Further details of the various service access ports 113 for the lift mechanism 110 are described herein at least with respect to FIGS. 2A and 2B.

As also shown in FIG. 1, the lift mechanism 110 may comprise a plurality of cover plates 116 coupled to upper surfaces of the circular or annular lift and rotation plate. The cover plates 116 may generally contact payloads that are engaged by the lift mechanism 110, such that secure and reliable engagement of the cover plates 116 to the lift and rotation plate may be important to ensure safe and balanced engagement of payloads. In addition, the cover plates 116 may cover, conceal, or protect internal portions of the lift mechanism 110 and the mobile drive unit 105. The cover plates 116 may be formed of various materials, such as metals, plastics, composites, or combinations thereof. Further details of the cover plates 116 for the lift mechanism 110 are described herein at least with respect to FIGS. 3A-3C.

Further, the lift mechanism 110 may also comprise a central cover 117 that may be substantially circular in shape to fit within a center of the lift and rotation plate, and may also include a cone- or funnel-shaped central portion. The central cover 117 may also cover, conceal, or protect internal portions of the lift mechanism 110 and the mobile drive unit 105. In addition, the central cover 117 may direct or funnel any liquids toward the cone- or funnel-shaped central portion and toward a cover drain hole, as further described herein. The central cover 117 may be formed of various materials, such as metals, plastics, composites, or combinations thereof. Further details of the liquid management features of the central cover 117 for the lift mechanism 110, as well as corresponding liquid management features of other portions of the mobile drive unit, are described herein at least with respect to FIGS. 4A-4C.

Although FIG. 1 illustrates a particular configuration and arrangement of various assemblies, subassemblies, and components of a mobile drive unit, other example embodiments may include other configurations or arrangements of various assemblies, subassemblies, and components of a mobile drive unit. For example, the chassis and/or chassis covers may have other shapes, sizes, or dimensions, the drive mechanism may have other numbers, configurations, or arrangements of actuators or drive wheels, the lift mechanism may have other numbers, shapes, sizes, dimensions, configurations, or arrangements of components or actuators, and/or various other modifications may be made in further example embodiments.

Figure 2A:
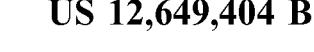
FIG. 2A is a schematic, perspective view diagram of example service ports of a lift mechanism, in accordance with implementations of the present disclosure.

FIG. 2A is a schematic, perspective view diagram 200A of example service ports of a lift mechanism, in accordance with implementations of the present disclosure. FIG. 2B are schematic, perspective and close-up, cross-sectional side view diagrams 200B of the example service ports of a lift mechanism, in accordance with implementations of the present disclosure.

As shown in FIG. 2A, a portion of a lift mechanism 220 may comprise a circular or annular lift and rotation plate 221, a central or base stator 222, a raceway access port 223, and one or more lubrication access ports 224. The lift mechanism 220 may comprise any and all of the various structural components, actuators, and other components configured to cause vertical and rotational movement of portions of the lift mechanism 110 shown and described with respect to FIG. 1. In addition, the example lift mechanism 220 of FIGS. 2A and 2B may be an example of portions of the lift mechanism 110 shown and described with respect to FIG. 1. However, various components and actuators of the lift mechanism 220 are not illustrated in FIG. 2A, for ease of illustration, such as motors, actuators, lifting components or arms, or various other components.

Figure 2A:
Figure 2B:
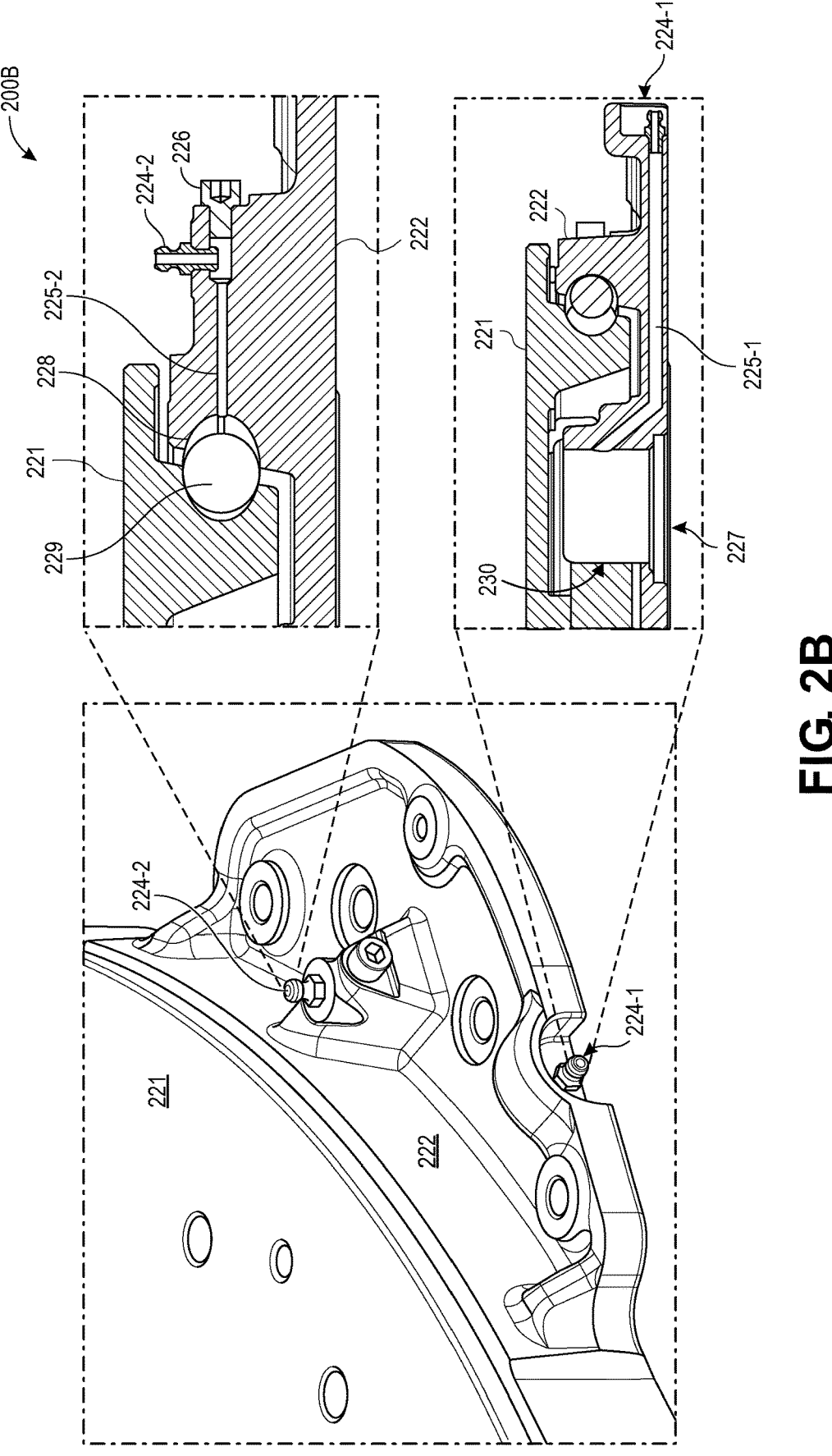
FIG. 2B are schematic, perspective and close-up, cross-sectional side view diagrams of the example service ports of a lift mechanism, in accordance with implementations of the present disclosure.

For example, the upper portion of the lift mechanism 220, as illustrated in FIG. 2, may comprise a substantially circular or annular lift and rotation plate 221 positioned around and on top of a central stator 222. The lift and rotation plate 221 and central stator 222 may move vertically upward to engage and couple with payloads, and may also move vertically downward to disengage and decouple from payloads. In addition, the lift and rotation plate 221 may rotate around a vertical axis substantially centered on the central stator 222 to rotate a payload relative to the mobile drive unit. The central stator 222 may remain rotationally fixed or stationary relative to the mobile drive unit, and may form a base upon which the lift and rotation plate 221 rotates relative to the mobile drive unit.

As shown in FIGS. 2A and 2B, in order to rotate the lift and rotation plate 221 of the lift mechanism 220 relative to the mobile drive unit, the lift mechanism 220 may comprise various actuators, an actuating gear or pinion 227, a mating gear or gear teeth 230, a raceway 228, and bearings 229 within the raceway. For example, the pinion 227 may comprise a rotatable gear, such as a spur gear, helical gear, or other types of gears operatively coupled to one or more actuators or motors. The mating gear 230 may be coupled to or formed as part of the lift and rotation plate 221, and the mating gear 230 may comprise a substantially circular or annular gear, e.g., a ring gear, having gear teeth that mesh with the teeth of the pinion 227. The type of gear teeth of the mating gear 230 may correspond to the type of gear teeth of the pinion 227. In addition, one or more actuators may cause rotation of the actuating pinion 227, and due to meshing teeth between the pinion 227 and the mating gear 230, the mating gear 230 and the lift and rotation plate 221 of the lift mechanism 110 may rotate responsive to actuation by the actuators and pinion 227.

Furthermore, in order to rotate the lift and rotation plate 221 of the lift mechanism 220 relative to the mobile drive unit, the raceway 228 may comprise a circular or annular track, channel, groove, or other passage that extends substantially around and/or underneath the lift and rotation plate 221. The raceway 228 may be positioned between portions of the lift and rotation plate 221 and other non-rotating portions of the lift mechanism 220, e.g., a base of the central stator 222. The plurality of bearings 229 may comprise balls, spheres, or other rollers that may be received within the raceway 228, and the bearings 229 may be formed of plastic, metal, composites, other materials, or combinations thereof. Further, the bearings 229 within the raceway 228 may facilitate smooth and/or continuous rotation of the lift and rotation plate 221 relative to the central stator 222 in either rotational direction around a vertical axis associated with a center of the central stator 222.

As shown in FIG. 2A, the raceway access port 223 may provide access to the raceway 228 and the plurality of bearings 229 received within the raceway. Generally, the raceway access port 223 may be covered by a corresponding cover piece or plate during operation, but the cover piece has been removed from FIG. 2A for clarity of illustration.

The raceway access port 223 may be accessed in order to clean, service, or maintain the raceway 228 and/or one or more of the plurality of bearings 229. For example, one or more bearings 229 may be removed, cleaned, repaired, and/or replaced. In addition, all bearings 229 may be removed, and the raceway 228 may be cleaned, serviced, or repaired. For example, the raceway 228 may be flushed with various cleaning fluids or materials, and/or a flexible snake or brush may be routed into the raceway 228 to remove debris, clean or polish surfaces, and/or otherwise maintain the raceway 228. In this manner, the raceway 228 and the plurality of bearings 229 may be quickly and easily cleaned, serviced, or maintained via the raceway access port 223.

As shown in greater detail in FIG. 2B, the one or more lubrication access ports 224 may be directly accessible to supply lubricant to the pinion 227, mating gear 230, raceway 228, and/or bearings 229. For example, the lubrication access ports 224-1, 224-2 may be directly accessible through corresponding holes or orifices within portions of the chassis cover 112-3, as shown and described with respect to FIG. 1. The first lubrication access port 224-1 may be directly accessible through a corresponding hole in a side surface or sidewall of chassis cover 112-3, and the second lubrication access port 224-2 may be directly accessible through a corresponding hole in a top or upper surface of chassis cover 112-3. In other example embodiments, a chassis cover having different sizes or shapes may be formed that encompasses or encloses the first and second lubrication access ports 224-1, 224-2, and potentially also the raceway access port 223, in order to further reduce the number of parts to remove, disassemble, and/or reassemble during maintenance of the lift mechanism 220.

As shown in the close-up, cross-sectional side view diagram at the lower right side of FIG. 2B, in example embodiments, a first lubrication access port 224-1 may be in fluid communication with the pinion 227 and mating gear 230 of the lift and rotation plate 221. The cross-sectional view of the first lubrication access port 224-1 of FIG. 2B may correspond to a vertical plane that includes a centerline that extends through the first lubrication access port 224-1, e.g., along a direction that corresponds to injection of lubricant via the access port, and a centerline of an access channel 225-1 associated with the first lubrication access port 224-1.

The first lubrication access port 224-1 may comprise a connector or valve to permit injection of lubricant, e.g., oil, grease, or other lubricants. The connector or valve may comprise a zerk fitting, grease fitting, grease nipple or nozzle, or other types of connectors. The first lubrication access port 224-1 may be in fluid communication with a first channel 225-1 that extends to the pinion 227. In addition, the first channel 225-1 may extend substantially along a horizontal plane, and may also rise at an angle to the horizontal plane in order to inject lubricant towards an upper or middle portion of the pinion 227. Upon injecting lubricant towards an upper or middle portion of the pinion 227, rotation of the pinion 227, as well as the force of gravity, may spread or disperse the lubricant over substantially all portions or gear teeth of the pinion 227. In addition, meshing contact between teeth of the pinion 227 and mating gear 230 may spread or disperse lubricant over most or substantially all gear teeth of the mating gear 230.

In this manner, lubricant may be quickly and easily supplied to the pinion 227, mating gear 230, and meshing teeth therebetween of the lift mechanism 220, in order to maintain smooth and continuous actuation and rotation of the lift and rotation plate 221 relative to the central stator 222.

As shown in the close-up, cross-sectional side view diagram at the upper right side of FIG. 2B, in additional example embodiments, a second lubrication access port 224-2 may be in fluid communication with the raceway 228 and the plurality of bearings 229 received therein. The cross-sectional view of the second lubrication access port 224-2 of FIG. 2B may correspond to a vertical plane that includes a centerline that extends through the second lubrication access port 224-2, e.g., along a direction that corresponds to injection of lubricant via the access port, and a centerline of an access channel 225-2 associated with the second lubrication access port 224-2.

The second lubrication access port 224-2 may also comprise a connector or valve to permit injection of lubricant, e.g., oil, grease, or other lubricants. The connector or valve may comprise a zerk fitting, grease fitting, grease nipple or nozzle, or other types of connectors. The second lubrication access port 224-2 may be in fluid communication with a second channel 225-2 that extends to the raceway 228, and may include a plug 226 at an end of the second channel 225-2 that is distal from the raceway 228. The plug 226 may comprise a screw, fastener, rivet, or any other component to block and substantially seal the distal end of the second channel 225-2. In addition, the second channel 225-2 may extend substantially along a horizontal plane, in order to inject lubricant towards an upper or middle portion of the raceway 228. Upon injecting lubricant towards an upper or middle portion of the raceway 228, movement or rolling of the bearings 229 within the raceway 228, as well as the force of gravity, may spread or disperse the lubricant over most or substantially all portions of the raceway 228 and bearings 229.

In this manner, lubricant may be quickly and easily supplied to the raceway 228 and the plurality of bearings 229 received therein, in order to maintain smooth and continuous rotation of the lift and rotation plate 221 relative to the central stator 222.

In example embodiments, all of the access ports, e.g., the raceway access port 223 and the two lubrication access ports 224-1, 224-2 shown in FIG. 2A, may be positioned or clustered proximate a same side, section, or portion of the lift mechanism 220, which may correspond to a lower left portion of the illustration of the mobile drive unit 105 shown in FIG. 1. In addition, the various access ports may be either directly accessible through holes or orifices associated with one or more covers, or may be accessible together upon removal or disassembly of one or only a few covers. By clustering the various access ports 223, 224 together relative to the lift mechanism 220, service and maintenance of various different components of the lift mechanism 220 may be facilitated without requiring removal, disassembly, and subsequent reassembly of many parts, covers, or other components in order to perform such maintenance.

Figure 3A:
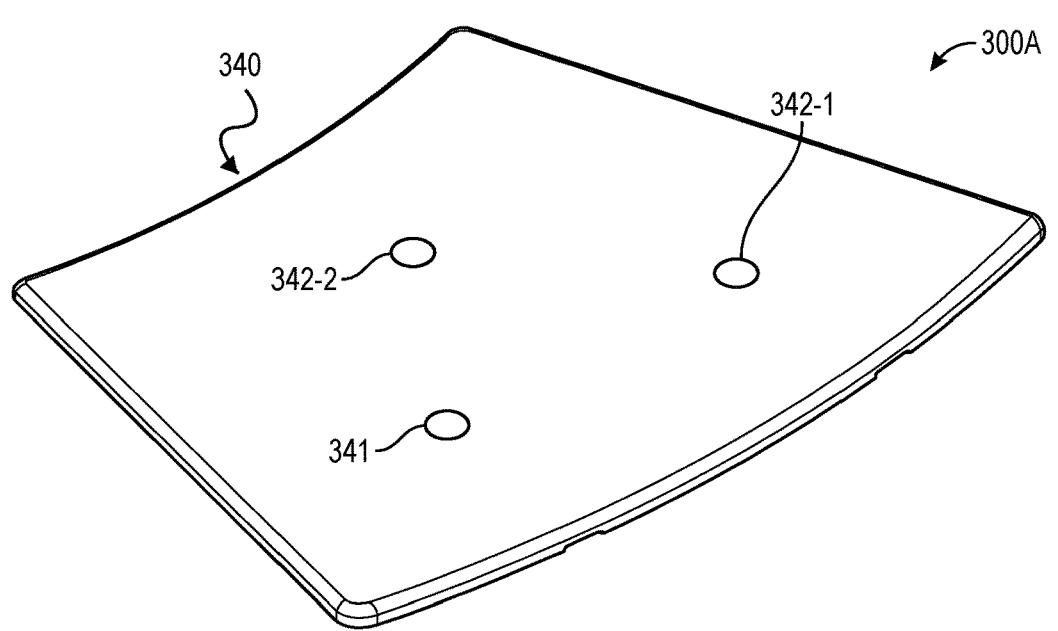
FIG. 3A is a schematic, perspective view diagram of an example cover plate of a lift mechanism, in accordance with implementations of the present disclosure.
Figure 3B:
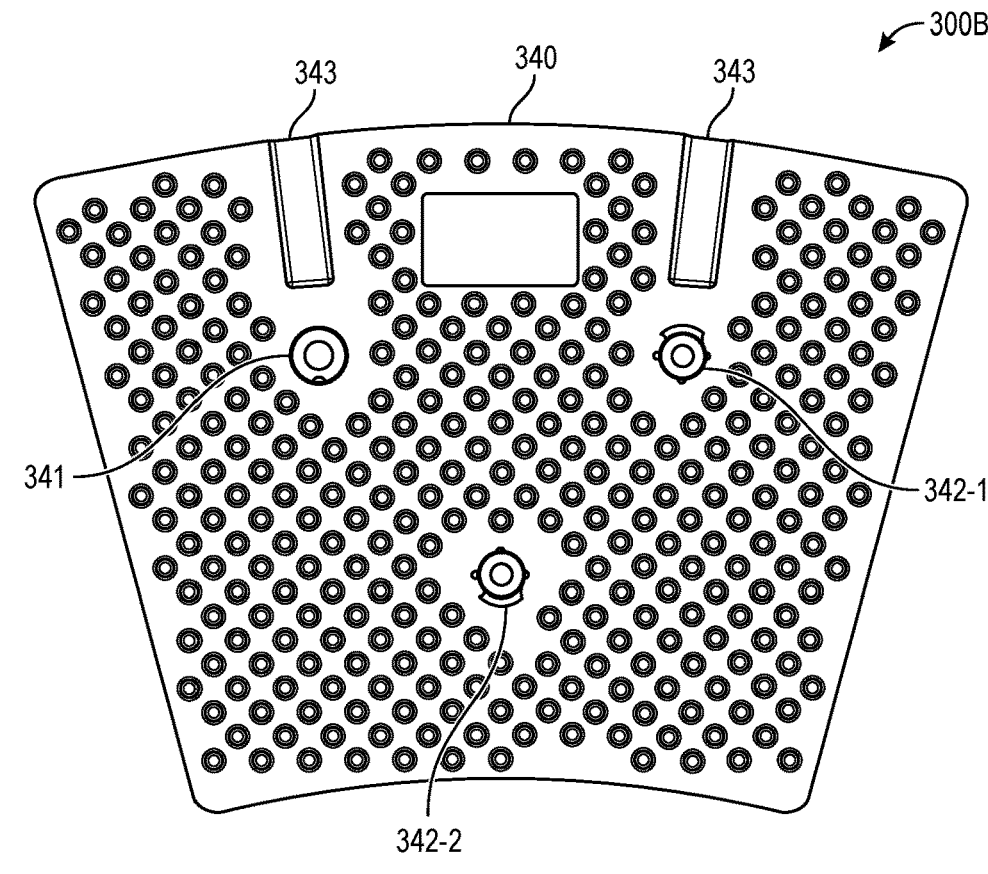
FIG. 3B is a schematic, underside view diagram of the example cover plate of a lift mechanism, in accordance with implementations of the present disclosure.
Figure 3C:
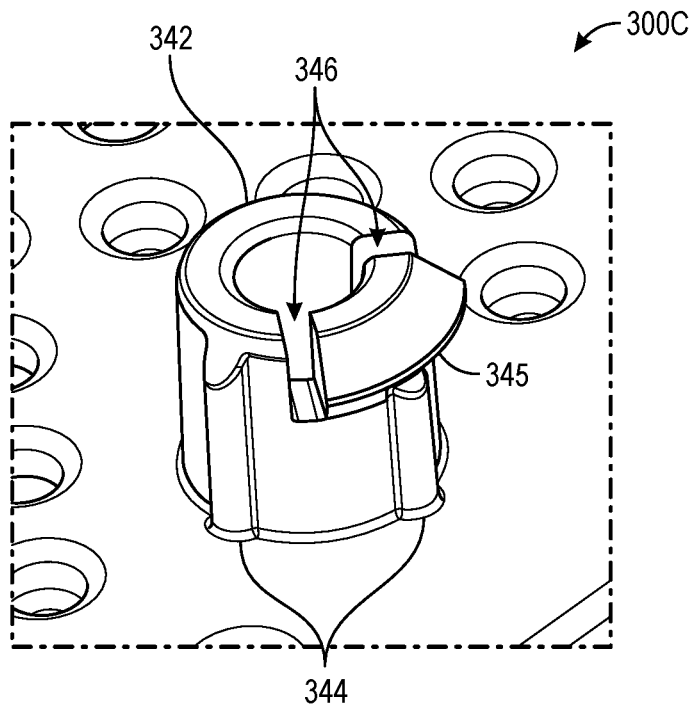
FIG. 3C is a schematic, close-up, perspective view diagram of an example attachment post of the cover plate of a lift mechanism, in accordance with implementations of the present disclosure.

FIG. 3A is a schematic, perspective view diagram 300A of an example cover plate of a lift mechanism, in accordance with implementations of the present disclosure, FIG. 3B is a schematic, underside view diagram 300B of the example cover plate of a lift mechanism, in accordance with implementations of the present disclosure, and FIG. 3C is a schematic, close-up, perspective view diagram 300C of an example attachment post of the cover plate of a lift mechanism, in accordance with implementations of the present disclosure. The example cover plate 340 of FIGS. 3A-3C may be an example of the cover plates 116 shown and described with respect to FIG. 1.

As shown in FIG. 3A, an example cover plate 340 may comprise a sheet, plate, or surface of material that has a curved, substantially trapezoidal shape. A plurality of cover plates 340 may be assembled together on an upper surface of the lift mechanism, as shown in FIG. 1. The cover plates 340 together may form a contact surface that may engage with various payloads that are lifted and/or transported by a mobile drive unit. In addition, the cover plate 340 may be formed of various materials, such as metals, plastics, composites, or combinations thereof.

In some examples, the cover plate 340 may have a substantially constant thickness throughout the entire surface area of the cover plate. In other examples, the cover plate 340 may have a variable thickness over portions of the surface area of the cover plate. For example, in some example embodiments, the cover plate 340 may have a relatively greater thickness at a portion that is associated with an outer periphery of the lift and rotation plate of the lift mechanism, and may have a relatively smaller thickness at a portion that is associated with an inner periphery of the lift and rotation plate of the lift mechanism, such that an upper surface of the cover plate 340 may be sloped or angled down toward a center of the lift mechanism. As described further herein at least with respect to FIGS. 4A-4C, the sloped or angled upper surfaces of the cover plates may also serve as liquid management features to facilitate the draining or removal of liquids from portions of the lift mechanism.

The cover plate 340 may also include symbols, marks, identifiers, or other indicators on an upper surface of the cover plate that are associated with locating posts 341 and attachment posts 342 that are positioned on an underside of the cover plate. For example, the symbols, identifiers, or indicators may comprise circles, crosses, dots, dimples, protrusions, or other indicators. Further, the symbols or indicators may provide visual guidance to agents, associates, or automated machinery during assembly, such that pressure or forces may be applied at or proximate the indicators in order to install or insert the locating posts 341 and attachment posts 342 without damaging other portions of the cover plate.

As shown in FIG. 3B, an underside of the cover plate 340 may comprise a locating post 341, one or more attachment posts 342, and/or one or more grooves 343. For example, the locating post 341 may comprise a pin, protrusion, prong, or other feature that extends from the underside of the cover plate 340 and is inserted into a corresponding hole or orifice of the lift and rotation plate of the lift mechanism. The locating post 341 may have a substantially cylindrical shape. In some examples, the locating post 341 may be sized to snugly fit within the corresponding hole. In other examples, the locating post 341 may be slightly larger, e.g., have a slightly larger diameter, than a size or diameter of the corresponding hole, such that the locating post 341 may have a press-fit engagement with the corresponding hole. The locating post 341 may have dimensions that are formed with relatively greater precision so that the locating post 341 may function to precisely position the cover plate 340 relative to the lift and rotation plate, whereas the attachment posts 342 of the cover plate may be formed with relatively lesser precision but may function to securely and removably engage with the lift and rotation plate.

The one or more attachment posts 342 may also comprise pins, protrusions, prongs, or other features that extend from the underside of the cover plate 340 and are inserted into corresponding holes or orifices of the lift and rotation plate of the lift mechanism. The attachment posts 342 may also have substantially cylindrical shapes, and in the example of FIGS. 3A-3C, two attachment posts 342-1, 342-2 may be provided on the underside of the cover plate 340. In example embodiments, the attachment posts 342 may include features associated with both press-fit engagement and snap-fit engagement with corresponding holes, as further described herein with respect to FIG. 3C.

The one or more grooves 343 may comprise portions of thinner material of the cover plate 340 that facilitate access to and removal of the cover plate from the lift and rotation plate of the lift mechanism. For example, a prying tool, flat head screwdriver, fingertip, or other thin tool may be inserted into the grooves 343 between the cover plate 340 and the lift and rotation plate in order to remove the cover plate, e.g., by overcoming or removing the press-fit engagement of the locating post 341 and/or the attachment posts 342, as well as by releasing or decoupling the snap-fit engagement of the attachment posts 342. Furthermore, as illustrated in FIG. 3B, the cover plate 340 may include various weight reduction features, such as dimples, cutouts, or other features, on the underside that reduce the total material, and as a result the weight, of the cover plate 340.

As shown in FIG. 3C, an example attachment post 342 may comprise one or more press-fit engagement features 344, a snap-fit engagement feature 345, and flexion grooves 346 associated with the snap-fit engagement feature 345. For example, the press-fit engagement features 344 may comprise bumps, ribs, protrusions, or other protruding features that are configured to cause press-fit or friction-fit engagement between the attachment post 342 and a corresponding hole. The press-fit engagement features 344 may at least partially increase a size or diameter of the attachment post 342, such that attachment post 342 may be installed or inserted into a corresponding hole with a press-fit and/or friction-fit engagement with walls or sides of the hole.

The snap-fit engagement feature 345 may comprise a flange, lip, hook, or other overhanging feature that is configured to clip, hook, latch, or otherwise lock into a corresponding feature or portion of a corresponding hole into which the attachment post 342 is inserted. The snap-fit engagement feature 345 may have a degree of flexibility or elasticity to bend or flex during insertion into the corresponding hole, as well as during removal from the hole. In addition, flexion grooves 346 may comprise grooves, cutouts, voids, or other material weakening features on opposite sides of the snap-fit engagement feature 345. The flexion grooves 346 may increase a flexibility or elasticity associated with the snap-fit engagement feature 345 in order to facilitate bending or flexing of the snap-fit engagement feature during insertion into or removal from a corresponding hole.

In example embodiments, as shown in FIG. 3B, two attachment posts 342-1, 342-2 may be positioned or oriented on the underside of the cover plate 340, such that respective snap-fit engagement features 345 of the attachment posts 342 extend in different directions relative to each other. In the example of FIG. 3B, the attachment post 342-1 may have a snap-fit engagement feature 345 that extends in a direction generally toward a top of FIG. 3B, and the attachment post 342-2 may have a snap-fit engagement feature 345 that extends in a direction generally toward a bottom of FIG. 3B. By using a combination of two or more attachment posts 342 having snap-fit engagement features that extend in different directions relative to each other, a secure engagement between the cover plate 340 and the lift and rotation plate may be formed without overconstraining the positions and orientations of the locating and attachment posts 341, 342 relative to their corresponding holes, and also without requiring excessive force to insert or remove the locating and attachment posts 341, 342 with respect to the lift and rotation plate of the lift mechanism.

The combination of press-fit engagement features 344 and snap-fit engagement features 345 associated with an attachment post 342 may therefore enable secure and reliable engagement between the cover plate 340 and the lift and rotation plate of the lift mechanism. In some examples, the secure engagement between the cover plate 340 and the lift and rotation plate may also prevent liquid ingress into a gap between the cover plate 340 and the lift and rotation plate of the lift mechanism. In addition, the combination of press-fit features 344 and snap-fit engagement features 345 associated with an attachment post 342 may also enable quick and easy removal of the cover plate 340 without damaging the attachment post 342 or respective features 344, 345, thereby facilitating removal, service, and/or replacement of the cover plates, as well as service or maintenance to portions of the lift mechanism or mobile drive unit that are covered or concealed by the cover plates.

Figure 4A:
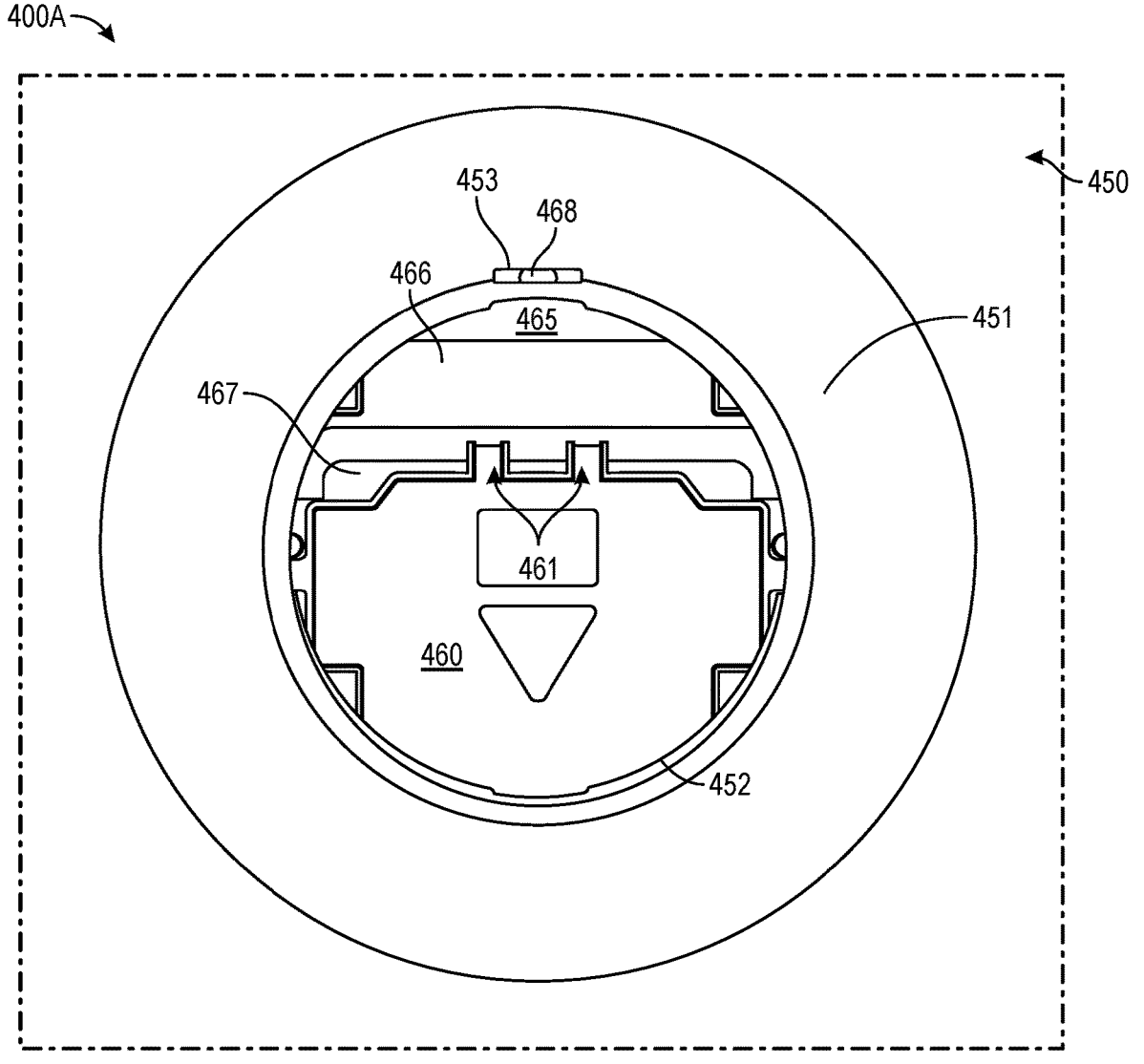
FIG. 4A is a schematic, plan view diagram of example liquid management features of a lift mechanism, in accordance with implementations of the present disclosure.
Figure 4B:
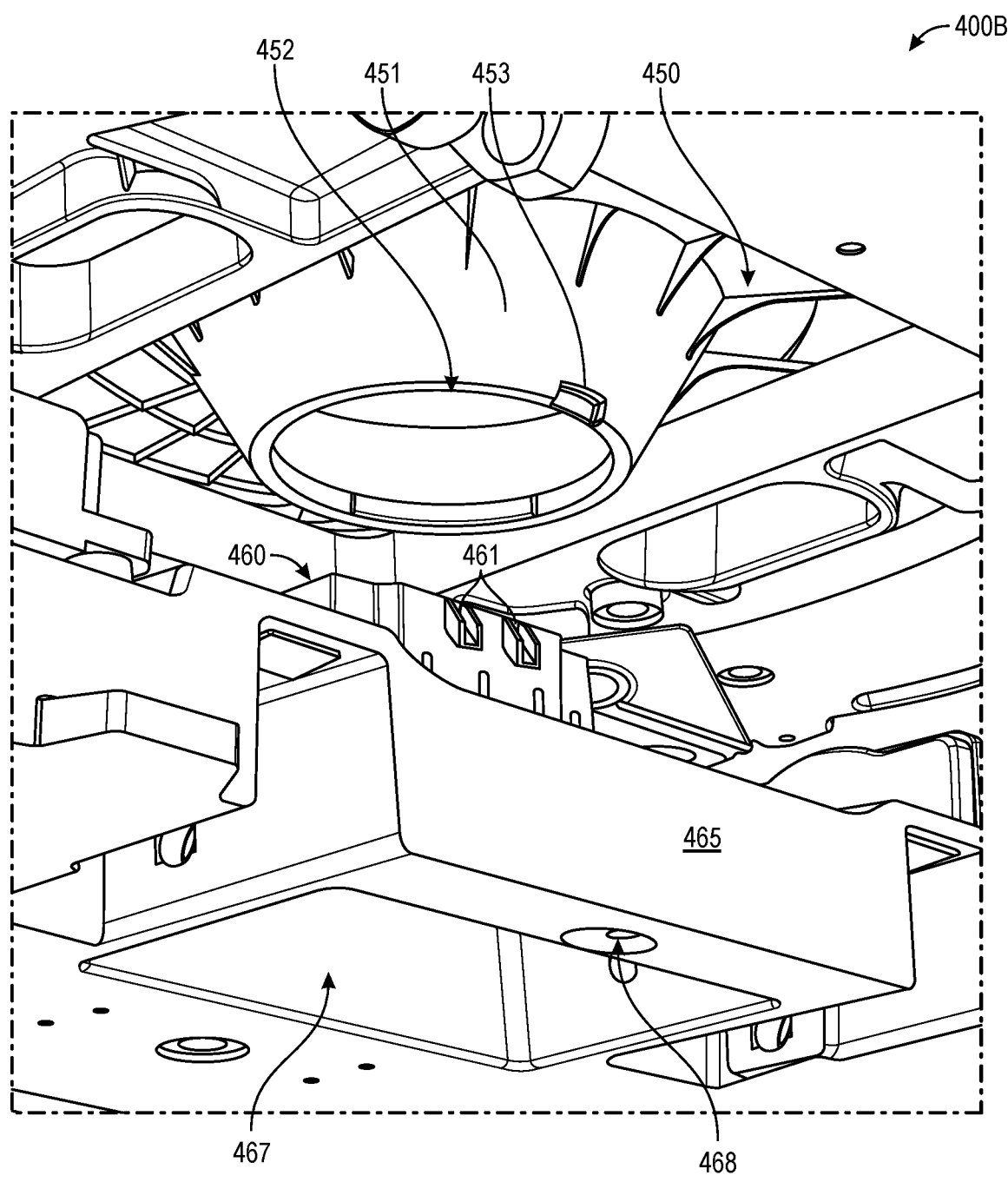
FIG. 4B is a schematic, underside, perspective view diagram of example liquid management features of a lift mechanism, in accordance with implementations of the present disclosure.
Figure 4C:
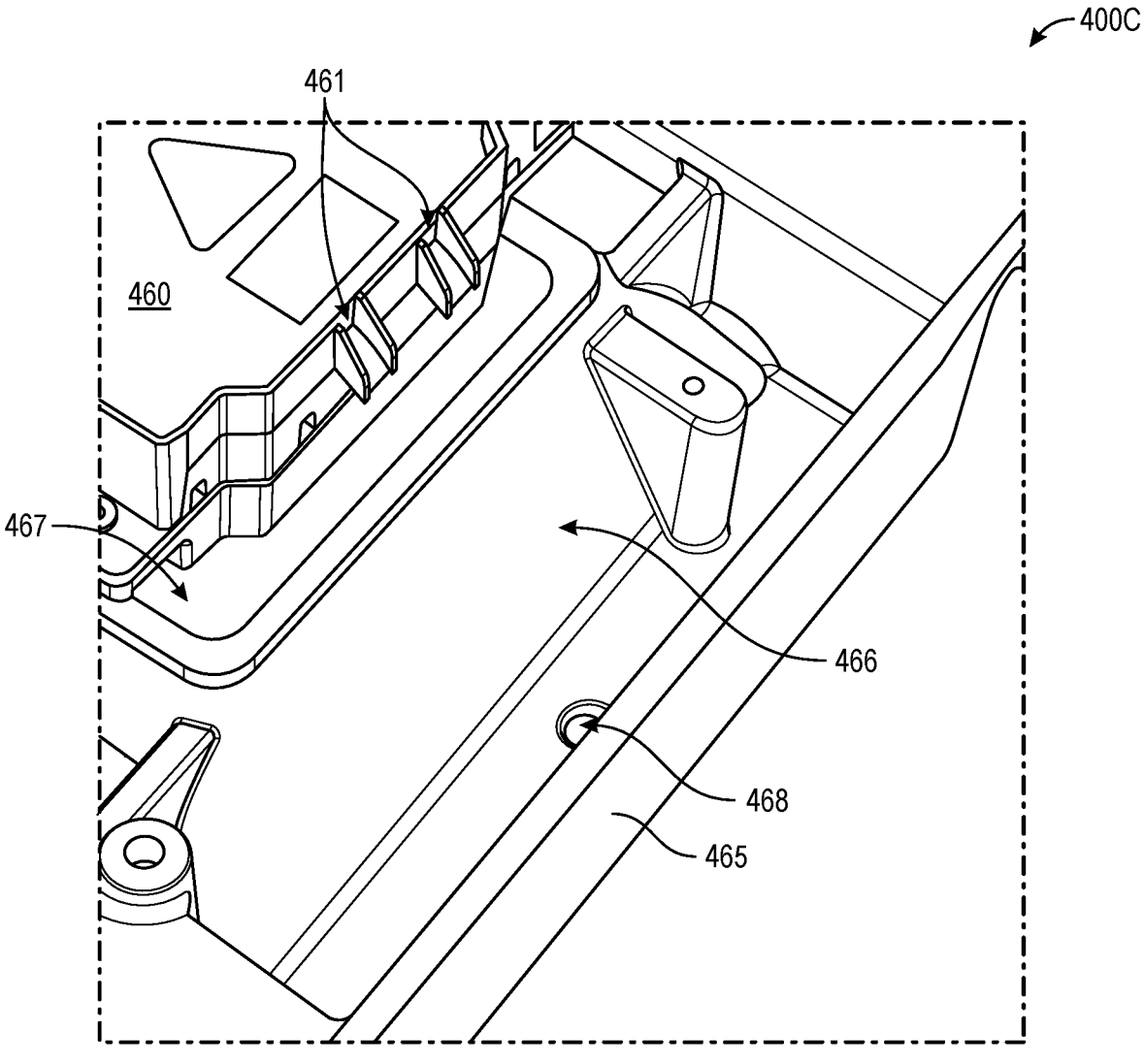
FIG. 4C is a schematic, perspective view diagram of example liquid management features of a lift mechanism, in accordance with implementations of the present disclosure.

FIG. 4A is a schematic, plan view diagram 400A of example liquid management features of a lift mechanism, in accordance with implementations of the present disclosure, FIG. 4B is a schematic, underside, perspective view diagram 400B of the example liquid management features of a lift mechanism, in accordance with implementations of the present disclosure, and FIG. 4C is a schematic, perspective view diagram 400C of the example liquid management features of a lift mechanism, in accordance with implementations of the present disclosure.

FIG. 4A shows a plan view diagram from above a lift mechanism and mobile drive unit, and substantially centered over the lift mechanism. In addition, FIG. 4B shows an underside, perspective view from underneath the chassis, a portion of which has been removed for clarity of illustration, and oriented upward toward an underside of the lift mechanism. Further, FIG. 4C shows an overhead perspective view from above the chassis, with the lift mechanism removed for clarity of illustration, and oriented downward toward an upper surface of the chassis that is positioned generally below the lift mechanism.

As shown in FIGS. 4A-4C, example liquid management features of a lift mechanism may comprise a central cover 450, a component cover 460, and a chassis 465. Various portions of each of the central cover 450, the component cover 460, and the chassis 465 may facilitate routing or draining of liquids down and/or away from the lift mechanism and/or the mobile drive unit. The central cover 450 and chassis 465 of FIGS. 4A-4C may be examples of portions of the central cover 117 and chassis 119, respectively, shown and described with respect to FIG. 1. Each of the central cover 450, the component cover 460, and the chassis 465, or portions thereof, may be formed of various materials, such as metals, plastics, composites, or combinations thereof. In various examples, the liquids that may come into contact with the lift mechanism and/or mobile drive unit may include water from emergency indoor sprinkler systems, water, oil, or liquids from various machinery, equipment, or systems within a facility in which the mobile drive unit is operating, and/or various liquids that may be carried or transported by the mobile drive unit, e.g., soaps, cleaners, sunblock, bottled water, beverages, engine oil, or various other types of liquids.

The central cover 450, as illustrated in FIGS. 4A and 4B, may comprise various liquid management features including a substantially circular or annular disk or plate, a funnel-shaped central portion 451, an inner rim 452, and a drain hole 453. For example, an upper surface of the central cover 450 may be a substantially circular or annular disk or plate extending around a center of the central cover 450. The surfaces of the circular or annular disk or plate may be curved, angled, or sloped toward a center of the central cover 450, in order to guide or direct liquids toward the funnel-shaped central portion 451.

The funnel-shaped central portion 451 may comprise a cone, funnel, or other tapered shape that also extends around a center of the central cover 450. An upper edge or rim of the funnel-shaped central portion 451 may couple to an inner edge of the circular or annular disk or plate, and the cone or funnel shape may extend toward a center of the central cover 450 and also toward an inner rim 452 of the funnel-shaped central portion 451. At one portion of the inner rim 452, a drain hole 453 may be formed as a hole or orifice along the inner rim 452. Further, the inner rim 452 may also be curved, angled, or sloped toward the drain hole 453. Thus, the funnel-shaped central portion 451 and the inner rim 452 may be formed or shaped to guide or direct liquids toward the drain hole 453.

Although not illustrated in FIGS. 4A and 4B, an additional circular cover may be coupled, attached, or positioned over the inner rim 452, in order to cover, conceal, or protect portions of the lift mechanism or other internal components of the mobile drive unit, such as various electronics, processors, memories, motors, sensors, or other components. The additional circular cover may also be curved, angled, or sloped toward the drain hole 453, in order to guide or direct liquids toward the drain hole 453.

By the combination of curved, angled, or sloped surfaces of the cover plates 340, as described at least with respect to FIGS. 3A-3C, the curved, angled, or sloped surfaces of the central cover 450, the sloped sidewalls of the funnel-shaped central portion 451, the curved, angled, or sloped surfaces of the inner rim 452 and/or additional circular cover, and the opening of the drain hole 453, liquids that may come into contact with upper portions of the lift mechanism may be effectively guided or routed down and away from the upper surfaces of the lift mechanism and toward and through the drain hole 453.

As shown in FIGS. 4A-4C, the component cover 460 may also comprise various liquid management features including a cover or shield that encloses, conceals, or protects an upper surface of an enclosure for various types of components, such as processors, memories, motors, actuators, sensors, power supplies, electronics, or other components. An upper surface of the component cover 460 may be a substantially flat surface, and one or more drain ramps 461 may be formed or coupled to the component cover 460. In some examples, an upper surface of the component cover 460 may also be curved, angled, or sloped toward the drain ramps 461, in order to guide or direct liquids toward the drain ramps 461.

Generally, with the central cover 450 and the additional circular cover coupled to the lift mechanism and positioned over the component cover 460, liquids may not come into contact with an upper surface of the component cover 460. However, the additional circular cover may not form a tight seal with the inner rim 452 of the central cover 450, such that some liquids may nonetheless enter or drip down onto the component cover 460. Thus, due to the curved, angled, or sloped upper surface of the component cover 460, and the paths or openings of the drain ramps 461, liquids that may come into contact with upper portions of the lift mechanism and drip down onto the component cover 460 may be effectively guided or routed down and away from the upper surface of the component cover 460 and toward and through the drain ramps 461.

As shown in FIGS. 4A-4C, the chassis 465 may comprise various liquid management features including a ramp 466, a central opening 467, and a chassis drain hole 468. For example, the ramp 466 may be formed as part of the structure of the chassis 465, and the ramp 466 may be generally or approximately aligned with the drain hole 453 of the central cover 450, in order to receive and guide or direct liquids toward the chassis drain hole 468. In addition, the ramp 466 may also be generally or approximately aligned with the drain ramps 461 of the component cover 460, in order to receive and guide or direct liquids toward the chassis drain hole 468. The chassis drain hole 468 may be formed as a hole or orifice at a base or lower surface of the chassis 465 and ramp 466.

In addition, the central opening 467 may be formed as an opening or orifice substantially at a center of the chassis 465, generally underneath a center of the lift mechanism and various electronics, motors, sensors, power supplies, processors, memories, or other components that may be housed or enclosed by the component cover 460. The central opening 467 may be generally or approximately aligned with portions of the component cover 460, as well as portions of the drain ramps 461, in order to receive and guide or direct liquids away from the mobile drive unit via the central opening 467.

By the combination of curved, angled, or sloped surfaces of the ramp 466, the central opening 467, and the opening of the chassis drain hole 468, liquids that may come into contact with portions of the chassis below the lift mechanism may be effectively guided or routed down and away from the upper surfaces of the chassis and toward and through the central opening 467 and/or the chassis drain hole 468. From the chassis opening 467 and/or the chassis drain hole 468, the liquids may contact a floor, ground, or other surfaces in an environment within which the mobile drive unit is operating.

In example embodiments, the various liquid management features of the central cover 450, the component cover 460, and the chassis 465 may effectively route liquids away from the lift mechanism, in order to ensure safe and reliable engagement, transport, and disengagement of payloads. In addition, the various liquid management features may route liquids away from various components, such as electronics, processors, memories, motors, actuators, sensors, power supplies, or other components, that may be damaged or adversely affected by water, liquids, or moisture. Further, the various liquid management features may route liquids down and out from a lower surface of the chassis of the mobile drive unit, thereby preventing accumulation of such liquids, debris, or other waste within the chassis, ensuring continuous reliable operation of the mobile drive unit, and reducing or minimizing service or maintenance to maintain proper operation of the mobile drive unit.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A mobile drive unit, comprising:
a chassis;
at least one chassis cover;
a drive mechanism; and
a lift mechanism comprising an annular lift and rotation plate configured to rotate relative to the chassis;
wherein at least one lubrication access port associated with the lift mechanism is accessible via an orifice of the at least one chassis cover;
wherein at least one cover plate is coupled to an upper surface of the annular lift and rotation plate;
wherein a central cover is positioned at a center of the annular lift and rotation plate; and
wherein the at least one cover plate and the central cover are angled toward the center of the annular lift and rotation plate to cause runoff of liquid away from the upper surface of the annular lift and rotation plate.

2. The mobile drive unit of claim 1, wherein the at least one lubrication access port is configured to provide lubricant to at least one of a pinion, a mating gear, a raceway, or at least one bearing associated with the annular lift and rotation plate.

3. The mobile drive unit of claim 2, wherein the at least one lubrication access port and a raceway access port are positioned at a same section of the lift mechanism.

4. The mobile drive unit of claim 1, wherein the at least one cover plate is removably coupled to the annular lift and rotation plate via a locating post and at least one attachment post, wherein the at least one attachment post includes a press-fit attachment feature and a snap-fit attachment feature.

5. A lift mechanism of a mobile drive unit, comprising:
a lift and rotation plate configured to rotate relative to a chassis of the mobile drive unit; and
at least one cover plate removably coupled to an upper surface of the lift and rotation plate via at least one attachment post including press-fit and snap-fit attachment features; and
a central cover positioned at a center of the lift and rotation plate and configured to channel liquid away from the upper surface of the lift and rotation plate;
wherein the at least one cover plate and the central cover are angled to cause runoff of liquid away from the upper surface of the lift and rotation plate.

6. The lift mechanism of claim 5, further comprising:
at least one service access port associated with the lift and rotation plate that is accessible via a chassis cover of the chassis;
wherein the at least one service access port further comprises:
a first lubrication access port configured to provide lubricant to a raceway and at least one bearing received in the raceway of the lift and rotation plate; and
a second lubrication access port configured to provide lubricant to a pinion and mating gear of the lift and rotation plate.

7. The lift mechanism of claim 6, wherein the first and second lubrication access ports are directly accessible via orifices provided in the chassis cover.

8. The lift mechanism of claim 6, further comprising:

a raceway access port configured to provide access to the raceway and the at least one bearing;

wherein the raceway access port is positioned proximate the at least one service access port.

9. The lift mechanism of claim 5, wherein the at least one cover plate further includes a locating post; and wherein the at least one attachment post comprises two attachment posts spaced apart from each other.

10. The lift mechanism of claim 9, wherein the two attachment posts further comprise:

a first attachment post including a first press-fit feature and a first snap-fit feature; and a second attachment post including a second press-fit feature and a second snap-fit feature.

11. The lift mechanism of claim 10, wherein the first and second press-fit features comprise bumps, ribs, or protrusions provided on outer surfaces of the first and second attachment posts and configured to be inserted into corresponding holes; and wherein the first and second snap-fit features comprise flanges, lips, or hooks configured to latch into the corresponding holes.

12. The lift mechanism of claim 10, wherein the first snap-fit feature extends in a first direction, and the second snap-fit feature extends in a second direction that is different from the first direction.

13. The lift mechanism of claim 5, wherein the central cover further comprises:

an annular surface;

a funnel-shaped portion connected to an inner edge of the annular surface;

an inner rim connected at an inner edge of the funnel-shaped portion; and a drain hole formed along the inner rim.

14. The lift mechanism of claim 13, wherein the annular surface, the funnel-shaped portion, and the inner rim are angled to cause runoff of liquid away from the upper surface of the lift and rotation plate toward the drain hole.

15. The lift mechanism of claim 14, wherein the at least one cover plate is angled to cause runoff of liquid away from the upper surface of the lift and rotation plate toward the central cover.

16. A method to manage liquid ingress for the lift mechanism of the mobile drive unit of claim 5, comprising:

causing, via the at least one cover plate, liquid to flow toward the center of the lift and rotation plate of the lift mechanism of the mobile drive unit, wherein the at least one cover plate is removably coupled to the upper surface of the lift mechanism and rotation plate; and causing, via the central cover, the liquid to flow toward the center of the lift mechanism and rotation plate and down through the mobile drive unit, wherein the central cover is positioned at the center of the lift mechanism and rotation plate;

wherein the at least one cover plate and the central cover are angled to cause runoff of the liquid away from the upper surface of the lift mechanism and rotation plate.

17. The method of claim 16, wherein the central cover comprises an annular surface, a funnel-shaped central portion, and an inner rim with a drain hole; and wherein the liquid is caused to flow along the annular surface, the funnel-shaped central portion, and the inner rim to the drain hole positioned proximate the center of the lift and rotation plate.

18. The method of claim 17, further comprising:

causing, via a component cover, the liquid to flow down through the mobile drive unit via at least one drain ramp of the component cover.

19. The method of claim 17, further comprising:

causing, via at least one chassis drain hole, the liquid to flow down and away from the mobile drive unit via at least one ramp positioned approximately underneath the drain hole of the central cover.

\* \* \* \* \*